April 25, 1950     R. G. CLAPP ET AL     2,505,525
DEVICE FOR TESTING PULSE TYPE RADAR SYSTEM
Filed July 26, 1944

INVENTOR.
RICHARD G. CLAPP
WILLIAM E. BRADLEY
BY
ATTORNEY

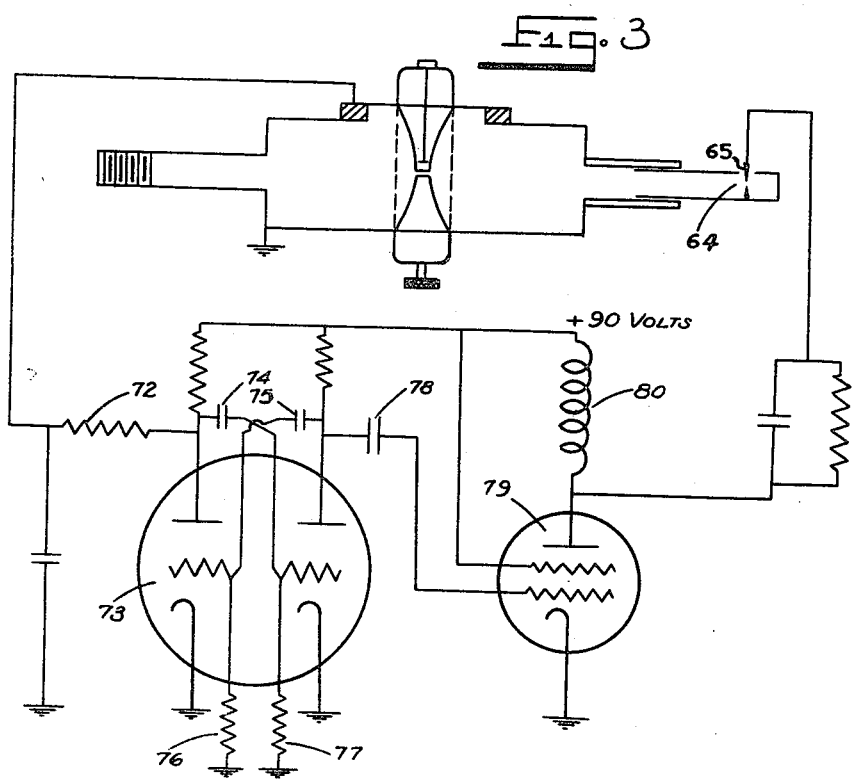
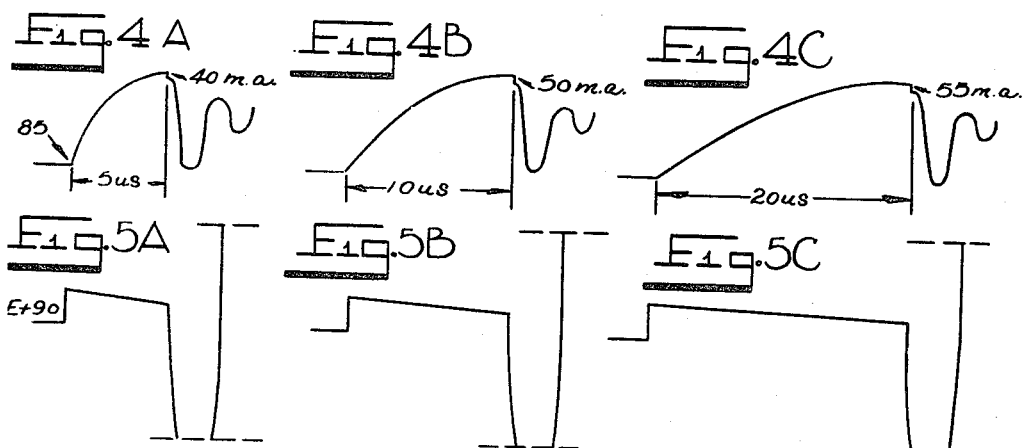

UNITED STATES PATENT OFFICE 2,505,525

DEVICE FOR TESTING PULSE TYPE RADAR SYSTEM

Richard G. Clapp, Haverford, and William E. Bradley, Swarthmore, Pa., assignors, by mesne assignments, to Philco Corporation, Philadelphia, Pa., a corporation of Pennsylvania Application July 26, 1944, Serial No. 546,628

4 Claims. (Cl. 343—5)

Our invention relates in general to the field of ultra-high frequency signalling, and more particularly concerns a novel portable radar system test device.

Generally, in radio ranging or radar equipment, an oscillator generates a comparatively large impulse of ultra-high frequency energy. This pulse is radiated in a suitable directional manner. Upon striking an object, a reflection at the same frequency is caused to travel back to the transmitting antenna whereat the reflection is received and applied to a suitable indicating device, as for example, a cathode ray tube.

The cathode ray detection equipment indicates the time interval between the transmitted and returned reflected waves thereby denoting the distance between the transmitting antenna and the reflecting object. The detection system also indicates, from the amplitude of the reflected wave, the nature of the reflecting object.

Heretofore, it has been essential in the calibration of radar equipment to utilize real reflections from objects at known distances. Evidently this type of calibration is subject to limitations, as the uncertainty of the exact distance to a reflecting object, and in the absence of real reflecting objects when the equipment is in service, as aboard ship. In the latter case, it has heretofore been essential to rely upon the original calibration of the equipment with attendant loss of accuracy whenever circuit changes or repairs were necessary.

It is the purpose of our invention to provide a simple and portable radar test device such that radar equipment may be accurately tested and calibrated both as to distinct and indefinite indication in the absence of real reflections.

Upon the receipt of impulses from the radar transmission equipment, the novel test set of our invention transmits these impulses through time delay and variable attentuation circuits and returns them to the original input circuit of the test device. At this point, the radar equipment under test accepts the returned delayed impulses and impresses them in the usual manner upon the detection equipment.

The time delay element of our novel circuit serves as a variable range reflecting object and the returned impulses may be delayed for any desired time interval of the order of two microseconds and greater. Since the radar equipment under test receives these delayed impulses in the same manner as reflected waves from a distant object, the delay circuit of the test equipment may be directly calibrated in terms of physical distance between the radar transmission equipment and a reflecting object.

The novel radar test circuit to be described is inherently stable, and accordingly will retain an accurate adjustable time delay characteristic for an indefinite period of time.

The input circuit of our novel radar system test equipment comprises a transmit-receive box, commonly known as a TR box. This TR box is of conventional design and is similar to that utilized in radar transmitting circuits to suitably decouple the transmisson and reception circuits.

The TR box utilized in our radar test set breaks down upon the reception of the high energy impulses, and in this manner generates an impulse of a suitably lower frequency, which is applied to an amplifier. The output of the amplifier is in turn applied to an adjustable time delay circuit. The output of the time delay network is in turn applied to an amplifier, the output circuit of which includes a high voltage induction coil. Upon the receipt of a signal from the amplifier, a discharge across a spark gap enclosed within a wave guide attenuator is produced.

The discharge of the spark gap generates a high frequency impulse which travels through the wave guide and is in turn coupled through the TR box to the original input circuit.

The wave guide which encloses the spark gap is dimensioned such that it will cut off above the desired radar frequency. Hence, the wave generated by the spark gap in travelling through the wave guide to the TR box is attenuated, and the attenuation is of course proportional to the geometry and length of the guide.

By a sliding section of the wave guide, we secure adjustable attenuation which serves to limit the amplitude of the returned signals. Through limitation of the amplitude of the returned signal to a known relative percentage of the impressed signal, it is possible to calibrate the radar equipment under test for indefinite reflections.

Summarizing, therefore, our novel radar test set provides means for absorbing the output of a conventional radar transmisson set, introducing predetermined time delay and attenuation and reintroducing the signals at the input terminals so as to simulate a reflected, attenuated wave. In this manner the radar set may be calibrated over the entire range of operation without reliance upon real reflecting objects.

It is therefore an object of our present invention to provide a radar testing device.

Another object of our present invention is to provide a test set for generating reflected signals upon the receipt of an ordinary radar test signal.

A further object of our present invention is to provide a radar transmission test device which will absorb the output of a conventional radar system, and provide reflections of known time delay and attenuation.

A still further object of our invention is to provide a convenient portable radar system check set for furnishing reflections in the absence of real objects at known distances.

These and other objects of our present invention will now become apparent from the following detailed specification taken in connection with the accompanying drawings in which:

Figure 3 is a schematic circuit diagram of a modified form of radar test circuit;

Figures 4A to 4C show plate current curves; and

Figures 5A to 5C show corresponding plate voltage curves in the last tube of the circuit of Figure 3.

In radar transmission, a pulse transmitter operating at an ultra-high frequency transmits regular high energy impulses at the rate of from 300–1400 per second. The pulses are of a duration of the order of one microsecond. The time elapsed between the transmission of an impulse and the reception of a returned reflection is the measure of the distance between transmitter and reflected object, and the magnitude of the returned pulse is indicative of the nature of the reflecting object.

Figure 1:
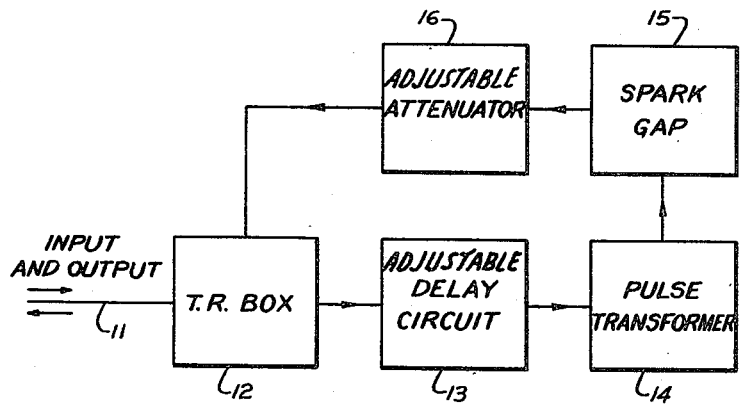
Figure 1 is a schematic block diagram of our novel radar test circuit.

Referring now to Figure 1, there is shown a block diagram of a test circuit, adapted to the calibration of a radar transmission system. A coupling unit schematically shown at 11 is utilized to connect the test set shown in Figure 1 to any radar transmission apparatus. This coupling line is connected to the output circuit of the radar transmission unit, and may also be connected to a dummy load to replace the effective output impedance of the radar antenna.

The coupling unit 11 is utilized both for the absorption by the test device shown in Figure 1 of the generated impulses of the radar transmission set and the return for the reflected signals. As shown, the signals are coupled into a transmit-receive or TR box 12 which breaks down upon the receipt of the high energy impulse. The break-down of the TR box 12 results in the generation of a lower frequency or video impulse which is applied to a time delay circuit 13. This delay circuit, as will later be described in detail, may comprise a resistance capacitance pi network of adjustable time constant. The impulse in travelling through the delay circuit 13 is retarded for a predetermined time, and applied to a pulse transformer 14. The pulse transformer 14 in turn steps up the voltage of the signal to a level sufficient to break down a spark gap 15 which is enclosed in a wave guide coupled to the return circuit of the TR box 12. The wave guide enclosing the spark gap 15 comprises essentially an attenuator 16 through which the signal generated at the spark gap must travel for application to the return side of the TR box 12.

The wave guide 16 is of adjustable attenuation and accordingly the signal as returned to the TR box 12 is of predetermined time delay and transmission loss. The impulse returned to the TR box is applied at a time when the TR box has regained its normal characteristics, and accordingly passes therethrough and into the coupling lead 11 to the radar transmission system. At this point, the returned wave is applied to the detection circuits so as to indicate, as in ordinary practice, the receipt of a reflection from an object.

Figure 2:
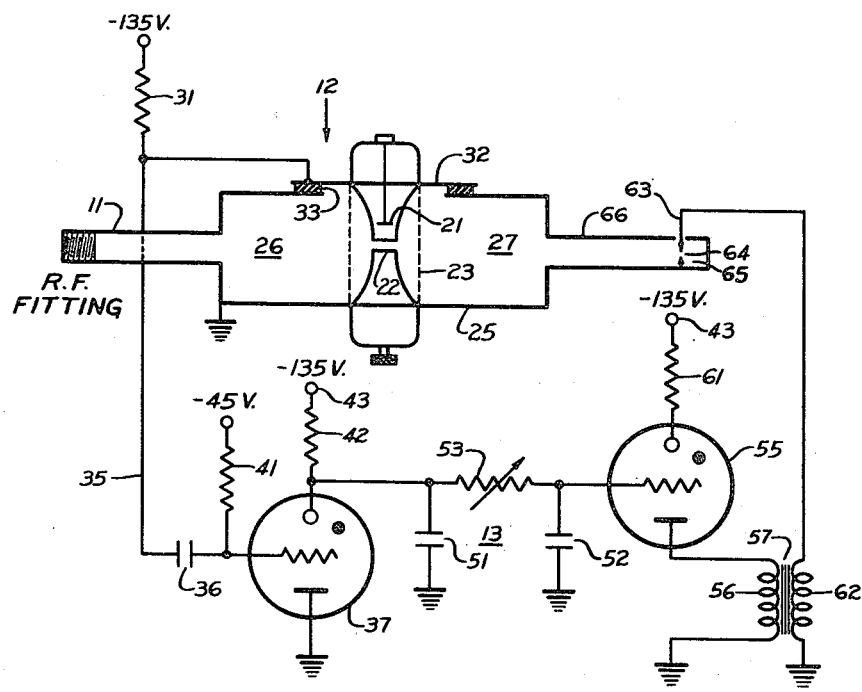
Figure 2 is a schematic circuit diagram of the radar test circuit.

Referring now to Figure 2, one form of the circuit elements of the test device is illustrated and arranged in the manner shown in the block diagram of Figure 1. Thus, the output signal from the radar transmission system is applied by means of the radio frequency coupling fitting 11 to the TR box 12.

The TR box schematically illustrated in Figure 2 comprises essentially a pair of oppositely disposed electrodes 21 and 22 within a glass enclosure 23. These electrodes are in turn disposed within a resonant cavity 25, composed of two sections 26 and 27. A transmit-receive box of this general construction is shown in the May 1945, issue of "Electronic Industries," on page 79, in an article on the "Operation of elements."

As illustrated in Figure 2, the TR box 12 is polarized by a direct current potential, the negative connected to a resistor 31, and the positive side grounded. The resistor 31 is connected at one end to the electrode 21 through a metallic plate 32 insulated at 33 from the grounded section 25 of the cavity. The resistor 31 is also connected by lead 35 through coupling condenser 36 to the grid of a cold cathode thyratron tube 37.

The grid potential of thyratron 37 is maintained at a potential below ground through the protective resistor 41. The plate of thyratron 37 is grounded as illustrated, and the cold cathode thereof connected to the negative end of the direct current supply through a load resistor 42. Under normal conditions, the potentials applied to the cold cathode, grid and plate of the thyratron 37 are such as to preclude conduction.

Upon the receipt of a high energy, ultra-high frequency pulse through the radio frequency coupling unit 11, the field within the cavity 25 causes a discharge between electrodes 21 and 22 of the TR box. During this discharge, current flows from the positive or grounded terminal 25 of the cavity through electrode 22 to insulated electrode 21 and through resistor 31 to the negative of the direct current supply. The electrical discharge between the electrodes 22 and 21 in the glass enclosure of the TR tube functions to block the cavity 25 by isolating section 27 from section 26, so that energy will not travel from the input 11 to the output 66. In this manner, the input circuits of the radar test set shown herein are decoupled from the output circuits to be described later.

The discharge between electrodes 22 and 21 within the TR box also functions instantaneously to place lead 35 at a less negative potential than its initial negative value. This potential however is governed by the video frequency of the discharge between the electrodes 22 and 21. This frequency is of considerably lower frequency than the original radar impulse, and serves to apply an impulse to the grid of thyratron 37 through coupling condenser 36. Under these conditions, thyratron 37 breaks down and conducts, and current flows from the grounded plate of thyratron 37 to the cathode and through load resistor 42 to the negative voltage source 43.

The video signal thereby generated across the load resistor 42 is directly coupled to the time delay circuit 13. This circuit as previously described, comprises a pi network including the two shunt condensers 51 and 52 and the series variable resistor 53. This simple network as is well known in the art, will provide a time delay proportional to the product of the magnitude of the resistors and condensers.

The resistor 53 is made variable and as such functions to provide a variable time delay for the transmission of the video pulse applied to the input of the delay circuit. Inasmuch as the time delay of the signal serves to represent the travel-time of a reflected wave in the radar transmission system, the time delay variation afforded by resistor 53 may be considered equivalent to a range control.

The delayed video impulse appearing across shunt condenser 52 is applied to a second cold cathode thyratron tube 55, the plate of which is grounded through the primary 56 of an impulse transformer 57. The cold cathode of the thyratron 55 is returned as the cathode of thyratron 37 through a load resistor 61 to the negative of the direct current supply 43.

The application of the video signal to the grid of thyratron 55 causes the thyratron to break down producing a high rate of change of current through the primary 56 producing a high voltage. The voltage is further stepped up considerably in the high tension secondary 62 of the step-up impulse transformer 57. The secondary of the impulse transformer 62 is grounded at one end and connected at the other end thereof to one electrode 63 of a spark gap 64. The low voltage electrode 65 of the spark gap is grounded.

The delayed video impulse in the secondary 62 of the impulse transformer is of sufficient magnitude to initiate breakdown of the spark gap 64 in the secondary circuit.

As is illustrated in Figure 2, the spark gap 64 is enclosed at one end of a wave guide 66. The wave guide 66 extends from the spark gap into the resonant cavity of the TR box 12. The impulse generated within the wave guide 66 upon the break-down of the spark gap 64 is of broad band and contains extremely high frequency components.

The wave guide 66 is dimensioned such that the desired radar test signal frequency is above a cut-off point of the guide. Accordingly, the signals of the desired frequency generated at the terminals of the spark gap 64 will be attenuated during transmission down the guide 66. The attenuation is of course a function of the length of the wave guide 66. Accordingly, the wave guide 66 may, through the use of a sliding section, be made of variable attenuation so that the return signal may be of any desired amplitude. The TR box cavity 25 is of the desired resonant frequency.

Since the TR box is critically tuned to the high radar transmission frequency, the signal through the cavity will be of the desired frequency. Thus the delayed and attenuated impulse is passed through the TR box and through coupling unit 11 to the radar transmission system, whereat the delayed pulse is received as would be a reflected signal. The coupling of the signal from the radar transmission system into coupling unit 11 is made comparatively loose, and accordingly it is essential that the tuning of cavity 25 be critically adjusted at the radar transmission frequency.

In a modified form of our invention, a multi-vibrator as shown in Figure 3 is substituted for the time delay circuit of Figure 2.

The TR box 12 in this embodiment is connected through resistor 72 to the plate of a double triode tube 73. Tube 73 is connected in a two stage resistance coupled amplifier in which the output of the second stage supplies the input of the first stage. This multi-vibrator circuit arrangement produces square pulse oscillations in the output of the second stage, the frequency of which is determined by the time constants of the grid condensers 74 and 75 and grid leaks 76 and 77.

The application of a voltage from the TR box into the circuits of the multi-vibrator changes the frequency of oscillations of the multi-vibrator.

A positive pulse from the second anode of the tube 73 is applied through condenser 78 to the grid of the four element tube 79. Before the application of this pulse the plate current in tube 79 through the coil 80 is comparatively small. When the pulse is applied to the grid of tube 79, the plate current rises to a value determined by the length of the pulse.

Figure 4A shows the plate current of the tube 79. At the instant the positive square pulse is applied to the grid, the plate current commences to rise, as shown at 85, to a value of 40 milliamperes in a period of five microseconds. At this instant the square pulse is terminated, cutting off the plate current. The sudden change in current through coil 80 results in a high induced voltage across this coil. This voltage plus the plate supply voltage applies a voltage of the order of 700 volts across the gap 64.

In Figure 5, we have shown the corresponding voltage on the plate of tube 79. The voltage drops momentarily during the time the current is rising to 40 milliamperes. At the end of this period, the voltage rises to a high value as shown.

Time delay is secured by varying the length of the pulses of the multi-vibrator by varying the magnitudes of resistors 76 and 77. As shown in Figure 4B, when the length of the square pulse is made ten microseconds, the plate current will rise to a value of 50 milliamperes before oscillations are set up in coil 70, and when the length of the pulse is made twenty microseconds, as shown in Figure 4C, the current rises to 55 milliamperes before oscillations occur. Attenuation is provided, as described in conjunction with Figure 2.

Since the range control provides a time delay and the variable attenuation provides an amplitude change of the reflected signal, it is evident that a combination of these two elements may be utilized to properly simulate a reflecting object at a considerable distance. Thus, by increasing the time delay and increasing the attenuation, the effect on the return pulse is that of a reflecting surface at a larger distance. The controls providing the variable time delay and attenuation thus may be ganged and calibrated in conjunction with each other. If the range and attenuation controls are utilized independently, then an overall check of the distinct and indefinite calibrations of the radar set may be obtained.

Obviously, therefore, this unit provides a convenient method of checking and testing all radar equipment in a laboratory or in service. Accordingly, it can be used for producing a simulated reflection from a very nearby object to determine the range at which the radar will respond. It can also be used as a quick check of any radar system without the necessity of any real reflections, and it can be used to check the range calibrations and sensitivity of a radar set. In addition, it provides a convenient laboratory device for utilization in connection with the continued design of radar systems and in connection with the instruction of operators in the use of radar.

It is thus evident that due to the utility of the device, various other modifications of the specific embodiment herein described may become evident to those skilled in the art. We prefer, therefore, to be bound not by the above specific disclosures, but by the appended claims.

We claim:

1. In an instrument for testing a system for the determination of the remoteness of objects by means of reflections of pulsed radio waves, a transmit-receive device for receiving signals from said system, an adjustable time delay circuit, means for applying said signals to said time delay circuit, an adjustable attenuating circuit comprising a wave guide having sliding sections, means for applying the output signals from said delay circuit to said attenuating circuit, and means for applying the output signals from said attenuating circuit back through said transmit-receive device to said system being tested.

2. In an instrument for testing a system for the determination of the remoteness of objects by means of reflections of pulsed radio waves, means controlled by output signals from said system for producing signals of a lower frequency, an adjustable time delay circuit, means for applying said lower-frequency signals to said time delay circuit, means connected to the output of said time delay circuit for increasing the voltage of said lower-frequency signals, means controlled by said higher-voltage lower-frequency signals for generating high frequency signals, said last mentioned means including a spark gap, an adjustable attenuating means comprising a wave guide having sliding sections, means for applying said generated high frequency signals to said attenuating wave guide, and means for applying said attenuated signals back to said system.

3. In an instrument for testing a system for the determination of the remoteness of objects by means of reflections of pulsed radio waves, a transmit-receive device having an input chamber and an output chamber, means controlled by signals from said system for blocking one chamber from the other to prevent energy flow therebetween, an adjustable time delay circuit, means for applying said signals to said time delay circuit thereby obtaining delayed signals, an adjustable attenuating circuit, means for applying said delayed signals to said attenuating circuit thereby obtaining delayed and attenuated signals, and means for applying said delayed and attenuated signals back through said transmit-receive device to said system.

4. In a device for testing a system for the determination of the remoteness of objects by means of reflections of pulsed radio waves, said system having an antenna fitting, a radio-frequency fitting for connecting said device to the antenna fitting of said system, a resonator resonant at the operating frequency of said system, a gaseous discharge tube connected to and responsive to the excitations of said resonator by the high-power output pulses from said system, said discharge tube producing a video pulse, adjustable means connected to said tube for delaying said video pulse by an adjustable time lag, means controlled by said delayed video pulse for exciting said resonator at an adjustable amplitude of sufficiently low power to prevent response from said gaseous discharge tube, the resulting oscillations in said resonator being of the frequency of said system, and means for feeding said signals back into said system through said radio-frequency fitting.

RICHARD G. CLAPP.
WILLIAM E. BRADLEY.

REFERENCES CITED

The following references are of record in the file of this patent:

UNITED STATES PATENTS

| Number | Name | Date |
|---|---|---|
| Re. 21,955 | Chaffee | Nov. 25, 1941 |
| 1,762,969 | Farrington | June 10, 1930 |
| 2,050,418 | Boerner | Aug. 11, 1936 |
| 2,134,716 | Gunn | Nov. 1, 1938 |
| 2,407,294 | Shockley et al. | Sept. 10, 1946 |
| 2,420,211 | Tourshou | May 6, 1947 |
| 2,421,016 | Deloraine | May 27, 1947 |
| 2,433,868 | Sensiper | Jan. 6, 1948 |
| 2,460,827 | Isley | Feb. 8, 1949 |

FOREIGN PATENTS

| Number | Country | Date |
|---|---|---|
| 552,072 | Great Britain | Mar. 23, 1943 |